United States Patent
Ganti et al.

(10) Patent No.: US 10,460,345 B2
(45) Date of Patent: Oct. 29, 2019

(54) CONTENT TARGETING WITH PROBABILISTIC PRESENTATION TIME DETERMINATION

(71) Applicant: International Business Machines Corporation, Armonk, NY (US)

(72) Inventors: Raghu K. Ganti, Elmsford, NY (US); Norbert Herman, Denver, CO (US); Shubhadip Ray, Somerset, NJ (US); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 451 days.

(21) Appl. No.: 14/743,645

(22) Filed: Jun. 18, 2015

(65) Prior Publication Data
US 2016/0371728 A1 Dec. 22, 2016

(51) Int. Cl.
*G06Q 30/02* (2012.01)
*G06F 3/0346* (2013.01)

(52) U.S. Cl.
CPC ....... *G06Q 30/0254* (2013.01); *G06F 3/0346* (2013.01); *G06Q 30/0261* (2013.01); *G06Q 30/0267* (2013.01)

(58) Field of Classification Search
CPC ................................................ G06Q 30/0261
See application file for complete search history.

(56) References Cited

U.S. PATENT DOCUMENTS

| 8,620,770 B1 * | 12/2013 | Pope ............... G06Q 30/0201 705/26.1 |
| 8,788,448 B2 | 7/2014 | Fadell et al. |
| 2006/0287813 A1 | 12/2006 | Quigley |
| 2006/0294084 A1 * | 12/2006 | Patel ................. G06Q 30/02 |

(Continued)

FOREIGN PATENT DOCUMENTS

| EP | 1393217 A1 | 3/2004 |
| EP | 2679042 A1 | 1/2014 |

OTHER PUBLICATIONS

"How Retail Stores Track You Using Your Smartphone (and How to Stop It)", by Alan Henry. https://lifehacker.com/how-retail-stores-track-you-using-your-smartphone-and-827512308. Jul. 19, 2013. pp. 1-7. (Year: 2013).*

(Continued)

*Primary Examiner* — William A Brandenburg
(74) *Attorney, Agent, or Firm* — Garg Law Firm, PLLC; Rakesh Garg; James Nock

(57) ABSTRACT

For targeted presentation of information on a mobile device, a presence of the device is detected at a given time at in a zone. A pause is detected in a movement of the device in the zone. A hangout pattern of the device is predicted. The hangout pattern includes an expected pause duration of the pause. Using the hangout pattern and the detected pause, a time is computed to present a content on the device. The content presented at the time is expected to have a higher than a threshold probability of receiving an input at the device. The content is selected according to the probability of receiving the input. The content is transmitted to the device such that the content is available for presenting at the device at the computed time.

18 Claims, 8 Drawing Sheets

(56) References Cited

U.S. PATENT DOCUMENTS

| | | | |
|---|---|---|---|
| 2010/0121567 A1 | 5/2010 | Mendelson | |
| 2010/0317371 A1 | 12/2010 | Westerinen et al. | |
| 2012/0271717 A1* | 10/2012 | Postrel .................. | G06Q 30/02 |
| | | | 705/14.58 |
| 2013/0225196 A1 | 8/2013 | James | |
| 2014/0278973 A1* | 9/2014 | Lowe ................ | G06Q 30/0255 |
| | | | 705/14.53 |
| 2018/0341965 A1* | 11/2018 | Rapperport ........ | G06Q 30/0206 |

OTHER PUBLICATIONS

IBM; Automatic Location Detection and Bluetooth Location Detection Device, Jun. 20, 2003.
Anonymous; Geo Beacon Position Verification, Dec. 14, 2011.
Anonymous; Mobile Device Resource Conservation During Geo-Location Operations, Oct. 2, 2013.
Anonymous; System and Method for Providing a Notification Beacon for a Handheld Device using a Bluetooth Smart Card Reader, Jan. 11, 2007.
Application to Markov Chains, http://aix1.uottawa.ca/~jkhoury/markov.htm.
Smart Data Collective; Beacon Technology Used by Companies, http://smartdatacollective.com/treddyumbelcom/281086/15-companies-a; Nov. 11, 2014.

* cited by examiner

CONTENT TARGETING WITH PROBABILISTIC PRESENTATION TIME DETERMINATION

TECHNICAL FIELD

The present invention relates generally to a method, system, and computer program product for delivering content to a user moving in a physical space. More particularly, the present invention relates to a method, system, and computer program product for content targeting with probabilistic presentation time determination.

BACKGROUND

A physical space comprises a place or area in which a user can move, such as by walking from one point in the physical space to another point in the physical space (hereinafter referred to as "space" or "area"). Some examples of the spaces include but are not limited to the aisles, concourses, hallways, pathways, waiting or dining areas, and generally areas on the floor space of retail stores, malls, airports, hotel lobbies, automotive dealership lots, showrooms, and the like.

Retailers, airport operators, and generally a Business-to-Consumer (B2C) operator are interested in understanding the movements of users through their spaces. This understanding helps these operators in interacting with the users in a variety of ways. With better understanding of the users' movements through an operator's space, for example, the operator can market their relevant products or services to a user while the user is in that space, the operator can position merchandise for better accessibility to the user, or the operator can improve the traffic flow through the space.

As an example, the advent of Bluetooth technology has empowered many operators to make creative use of Bluetooth beacons for detecting and engaging with users based on their physical location in the operators' spaces. Often, an operator tracks the user's position or location within a space by having the user install a software application on the user's mobile device, which the user carries in the operator's space. The software application establishes communication with one or more Bluetooth beacons situated at known locations within the space. The application on the user's device uses these communications to reveal the user's location proximate to the known location of the beacon, thereby enabling the operator to learn the user's approximate location in the space.

Presently, by knowing a user's presence within a space, an operator targets content, such as advertising, discount offers, promotions, rewards, product information, and the like, to the user's device. This targeting presently takes one of two forms—broadcast transmission to any device within the space, or transmission of specific content to specific device. When targeting specific device with specific content, knowing the user's device's location relative to a floor-plan of the space, present technology enables operators to select content that is relevant to the merchandise within a certain distance of the user at that location.

SUMMARY

The illustrative embodiments provide a method, system, and computer program product for content targeting with probabilistic presentation time determination. An embodiment includes a method for targeted presentation of information on a mobile device. The embodiment detects, at an application executing using a processor and a memory, a presence of the device at a given time at in a zone. The embodiment detects a pause in a movement of the device in the zone. The embodiment predicts a hangout pattern of the device, where the hangout pattern includes an expected pause duration of the pause, e.g., as expected by an operator. The embodiment computes, using the processor and the memory, using the hangout pattern and the detected pause, a time to present a content on the device, where the content presented at the time is expected to have a higher than a threshold probability of receiving an input at the device. The embodiment selects the content according to the probability of receiving the input. The embodiment transmits the content to the device such that the content is available for presenting at the device at the computed time.

Another embodiment includes a computer program product for targeted presentation of information on a mobile device, the computer program product comprising one or more computer-readable storage devices, and program instructions stored on at least one of the one or more storage devices.

Another embodiment includes a computer system for targeted presentation of information on a mobile device, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
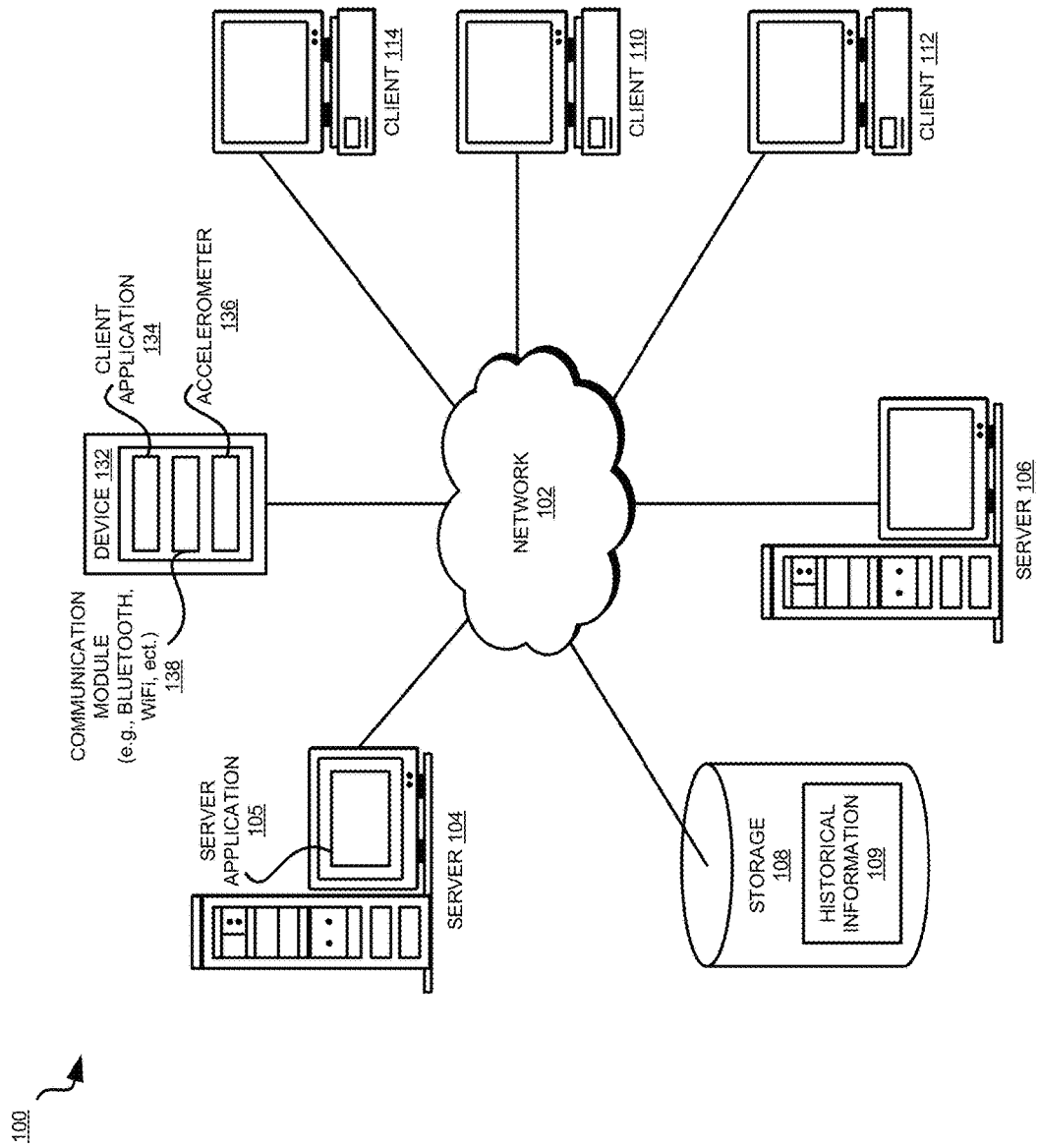
FIG. 1 depicts a block diagram of a network of data processing systems in which illustrative embodiments may be implemented.

The illustrative embodiments recognize that an effectiveness of transmitting the content to a user's device is dependent upon several factors beyond those used in the prior-art. For example, the illustrative embodiments recognize that even if the content is selected according to the location of the user (i.e., the location of the user's device), there is no presently-used method of knowing whether the user is looking at the content presented on the user's device and whether the user is interested in the merchandise to which the content pertains. For example, if a user's location is detected in a childcare products aisle and a discount on a childcare product is transmitted to the user's device, the user may be just passing through the childcare aisle with no interest in childcare products. Thus, the content, even though targeted based on the user's location, is a wasted effort due to a poorly recognized opportunity.

As another example, the illustrative embodiments recognize that even if the content is selected according to the location of the user, and even if the user is interested in the substance of the content, there is no guarantee that the user will see or otherwise engage or interact with the content upon receiving the content. For example, if a user's location is detected in a childcare products aisle and a discount on a childcare product is transmitted to the user's device, even if the user has an interest in childcare products, there is no presently-used method to predict whether the user will actually see or use the content towards the user's interest. Thus, the content, even though targeted based on the user's location, is largely a wasted effort and only has an accidental chance of being used.

The illustrative embodiments used to describe the invention generally address and solve the above-described problems and other problems related to targeted transmission and use of content to a device of a user present in an operator's space. The illustrative embodiments provide a method, system, and computer program product for content targeting with probabilistic presentation time determination.

An embodiment operating in a server application (a server-side embodiment) maintains a set of beacons within a space where the locations of the beacons are pre-determined. The geographical location data (geo data) detection can be achieved through the use of Bluetooth beacons, Wi-Fi access points, other communication apparatus, or some combination thereof. The embodiment makes use of the merchant's planogram or layout by placing Bluetooth, Wi-Fi, and other similarly purposed geographical location detecting devices into zones that are arranged according to an operator's layout of the space. For example, a retail floor space can be divided by a grid such that a beacon is situated at one or more corners of each block of the grid. A block of the grid forms a zone, and the embodiment can narrow the user's location, to wit, the user's device's presence to a zone depending upon the device's communication with a beacon associated with the zone.

An embodiment operating in a client application (a client-side embodiment) collects and sends the beacon communication data for a server-side embodiment to detect the user's location in a manner described herein. The client-side embodiment also collects accelerometer data from the user's device and sends to the server-side embodiment.

A server-side embodiment uses the accelerometer data to detect pauses in the user's device's movements. For example, when the device is moving, such as when the user is walking, the accelerometer data shows movement through change in the values of certain accelerometer attributes. When the device is not moving, such as when the user is standing and observing the merchandise at a location, the accelerometer data shows a pattern of non-movement, or pause, through unchanging values of those accelerometer attributes. The accelerometer data can also indicate a position or orientation of the device, such as whether the device is in a viewing position relative to the user.

A server-side embodiment also receives from a user's device information sufficient to identify the device. The server-side embodiment maintains a repository of historical data collected from the device over a period. For example, the server-side embodiment saves the location information and traversal or travel information computed from the beacon communication data, as a travel history of the device. Similarly, the server-side embodiment saves the pause information computed from the accelerometer data, as a pause history of the device.

When the server-side embodiment saves the historical information of a device, the server-side embodiment also records a set of parameters that are applicable to the historical information. For example, travel patterns of a user are often different during different times of the day, different days of the week, holidays or occasions, during certain weather conditions, and the like. The date, the time, the weather, the holiday or occasion, the store promotion, and many such parameters that are applicable to the device's travel and pause information are stored as a part of the device's historical information.

The information about the current traversal of the device through the space and the current pauses in that traversal is useful in determining which content to select for transmitting to the device, and when to send the selected content to the device. For example, using the current traversal and pause information, a server-side embodiment can determine that the content that relates to the merchandise situated at the location of a pause should be selected and should be sent during a pause in a traversal and not during movement of the device in the space.

Another server-side embodiment further refines the time of sending the selected content using historical information. The question such a server-side embodiment answers is this—even though the user is paused, when is the user most likely to be receptive to the content, so as to engage with the content in some manner. The user can be paused for a variety of reasons, and it is a non-trivial problem to determine a time during the pause when the user is most likely to interact with the content that is transmitted. This server-side embodiment seeks to identify the probabilities of user interaction with content transmitted at one or more different times during a pause.

To accomplish this probability computation, a server-side embodiment uses the historical information, which also includes data about past interactions of the user or other users, such as other users who may be similar in some respect to an unknown user, with the content that was transmitted to the user's device during past pauses. For example, a server-side embodiment saves as a part of the historical information interaction data received from a client-side embodiment. Some examples of the interaction data captured by a client-side embodiment and sent to a server-side embodiment include but are not limited to—click information whether a user clicked or provided an input to the device relative to the content, point of sale (POS) information whether the user ultimately bought an item that was a subject of the content, conversion identifier and other identifiers to track a user's interactions or transactions, and the like. A conversion identifier is an identifier associated with a transaction in which a sale prospect is converted into an actual sale.

A server-side embodiment uses the historical information about whether and when the user interacted with or used the transmitted content historically, as a factor in predicting a probability whether the user will interact with the content that is about to be transmitted at a determined time during a pause. For example, the server-side embodiment may determine that if the content is transmitted 5 seconds before the end of a pause, the probability that the content will be used in some manner is sixty percent, but if the content is transmitted 2 seconds before the end of a pause, the probability that the content will be used in some manner is eighty percent. In one server-side embodiment, ongoing pattern detection with adjusted models executes to refine the pause zone predictions in a machine-learning process.

Even though a user may be currently paused somewhere in the space, how long is the user expected to pause there? Where will the user likely traverse to next, and where will the user pause during that traversal? These and other similar questions have also to be answered if the content has to be targeted at the right time. For example, in the above example computation of the probability of eighty percent, a server-side embodiment has to know when the pause is expected to end so that the transmission can occur 2 seconds prior to that expected end.

A server-side embodiment determines or predicts a hangout pattern for the device. A hangout pattern is a pattern of traversals and pauses of a device, and consequently of a corresponding user of the device, through the space. A hangout pattern informs a server-side embodiment how long the user can be expected to pause at a given location, where the user is likely to traverse next, and where the user is expected to pause during that traversal. For example, in the above example computation of the probability of eighty percent, a server-side embodiment uses a hangout pattern associated with the device to know when the current pause is expected to end so that the transmission can occur 2 seconds prior to that expected end.

How is a hangout pattern computed, and how does a device become associated with a particular hangout pattern? To address these and other similar questions, a server-side embodiment uses the historical information repository, which stores historical information of the traversals, pauses, parameters, past interaction data, and other similarly purposed information of several devices over several periods. A Markov chain model is one non-limiting analytical model for identifying state transition, which is executed for pattern prediction that is useful in this function of a server-side embodiment.

In one server-side embodiment, when a device is identified in the space, the server-side embodiment determines whether the device is known or new, to wit, whether the historical information repository includes historical information from the identified device, and therefore of the associated user. If the device is known, the server-side embodiment further determines whether a set of parameters of the current presence, such as a time, day, weather, occasion, and the like, match a set of parameters recorded with any historical information of the device.

When all or a subset of parameters of the current presence match all or a corresponding subset of parameters of the device's historical information within one or more threshold degrees of match, a hangout pattern formed in the device's historical information is associated with the device during the current presence in the space. In other words, the server-side embodiment expects that the device will traverse and pause in the space in a manner similar to the traversals and pauses in the matching historical information of the device.

In another server-side embodiment, when a device is identified in the space, the server-side embodiment determines that the device is new, to wit, the historical information repository does not include historical information from the identified device, and therefore of the associated user. When the device is unknown, there is no device-specific hangout pattern from the past that can be associated with the device during the current presence of the device.

In such a case, a server-side embodiment attempts to determine whether the device and device's movements appear to resemble the hangout pattern of another device. In other words, the server-side embodiment determines whether the device is a look-alike of another device. The server-side embodiment matches the set or a subset of parameters of the device's current presence with a set or a corresponding subset of parameters of other devices' historical information within one or more threshold degrees of match. For example, the server-side embodiment attempts to find those devices' historical information where the day and time of the current presence, the occasion during which the current presence occurs, and other such parameters are similar.

A hangout pattern formed in such other devices' (look-alike device or devices) historical information is associated with the device during the current presence in the space. In other words, the server-side embodiment expects that the device will traverse and pause in the space in a manner similar to the traversals and pauses in the look-alike devices' historical information.

In many cases, matching a device's current presence with historical information of the same device or a look-alike device can be restrictive. To overcome this issue, a server-side embodiment forms clusters of historical information in an effort to find hangout patterns of the clusters. When several devices traverse and pause in substantially similar ways under similar parameters, a cross-reference to similar clusters of the historical information of such devices yields a hangout pattern of a cluster in one server-side embodiment. The server-side embodiment then attempts to match the set or a subset of the parameters of a current presence of a known or an unknown device with the set or a corresponding subset of the parameters of a cluster.

A hangout pattern of a matching cluster is associated with the device during the current presence in the space. In other words, the server-side embodiment expects that the device will traverse and pause in the space in a manner similar to the traversals and pauses of the cluster of devices.

Thus, a server-side embodiment identifies a device during a current presence in a space, determines a hangout pattern that provides the probabilities of traversals and pauses of the device during the current presence in the space. Using the hangout pattern, a server-side embodiment selects a time during a pause of the device when the server-side embodiment should transmit content to the device.

A server-side embodiment determines a probability of the user interacting with the transmitted content. For example, in one server-side embodiment, Classification and Regression Tree (CART) analytical modeling technique is used to compute this probability. Depending on the probability value produced, a server-side embodiment selects the content for transmission. For example, a high-value content, such as a discount offer, should be sent when the probability that the user will interact with the content exceeds a threshold probability. When the probability that the user will interact with the content does not exceed the threshold probability, a lower value content, such as a product advertisement can be selected for sending. More than one threshold probabilities can be defined to select from more than one category of content or content values.

One or more threshold probabilities can be learned or adjusted using a machine-learning process. For example, a threshold can be adjusted by collecting user interactivity data from one or more devices over a period. If, for example, the user appears to be interacting even with low-value content that was selected according to a previously selected probability threshold, the threshold can be lowered to allow more high-value content to be selected. Some non-limiting example ways of learning threshold probabilities include identifying when the user clicks on or interacts with various contents or notifications sent to a client-side embodiment, identifying from POS data that a user has completed a purchasing transaction using some information, such as a coupon code, that was provided in the content. These examples of adjusting and learning probability thresholds are not intended to be limiting. From this disclosure, those of ordinary skill in the art will be able to conceive many other ways of adjusting and learning probability thresholds and the same are contemplated within the scope of the illustrative embodiments.

A server-side embodiment further tracks the user interactivity with the transmitted content and saves the interactivity data in the historical information as described in this disclosure. For example, a client-side embodiment monitors the user's interactions with the content received at the device. The client-side embodiment provides the user interactivity data to the server-side embodiment. The interactivity data provided by the client-side embodiment to the server-side embodiment forms a feedback loop, using which the server-side embodiment computes an effectiveness value of the content.

In some cases, the user may not interact with the content in a manner that is suitable for capturing the interaction. For example, a glance at a visual content on the device's screen is a user interaction with the content but a glance cannot be effectively or definitively captured, even if the client-side embodiment monitors the eye movements of the user. In these and other circumstances, other systems can provide the feedback information. For example, suppose that the transmitted content related to a childcare product, and the user glanced at the content but did not provide an input that the client-side embodiment could capture and send as interactivity data. However, a POS system records a sale of the childcare merchandise to the user. The POS system provides the sale information as feedback to one server-side embodiment. The server-side embodiment uses the sale information as interactivity information to determine the effectiveness value of the content.

A method of an embodiment described herein, when implemented to execute on a device or data processing system, comprises substantial advancement of the functionality of that device or data processing system in improving targeted content delivery to users present in a physical space. For example, prior-art either broadcasts content to all devices present in the physical space, or sends the content to specific device without knowing whether the content is actually likely to be used by the user of the specific device. An embodiment determines a time during a pause in a predicted hangout pattern at which to send content that has been selected according to the location of the pause. An embodiment further determines a probability that the user will interact with the content, to select the content and the delivery time of the content. An embodiment further measures the effectiveness of the content through one or more types of feedback data. Such manner of content targeting with probabilistic presentation time determination is unavailable in presently available devices or data processing systems. Thus, a substantial advancement of such devices or data processing systems by executing a method of an embodiment improves the effectiveness of the targeted content, utility of the content to the targeted user, and the overall experience and value of business transactions to users and operators.

The illustrative embodiments are described with respect to certain spaces, beacons, detections, locations, patterns, types of data, content, probabilities, thresholds, interactions, feedbacks, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
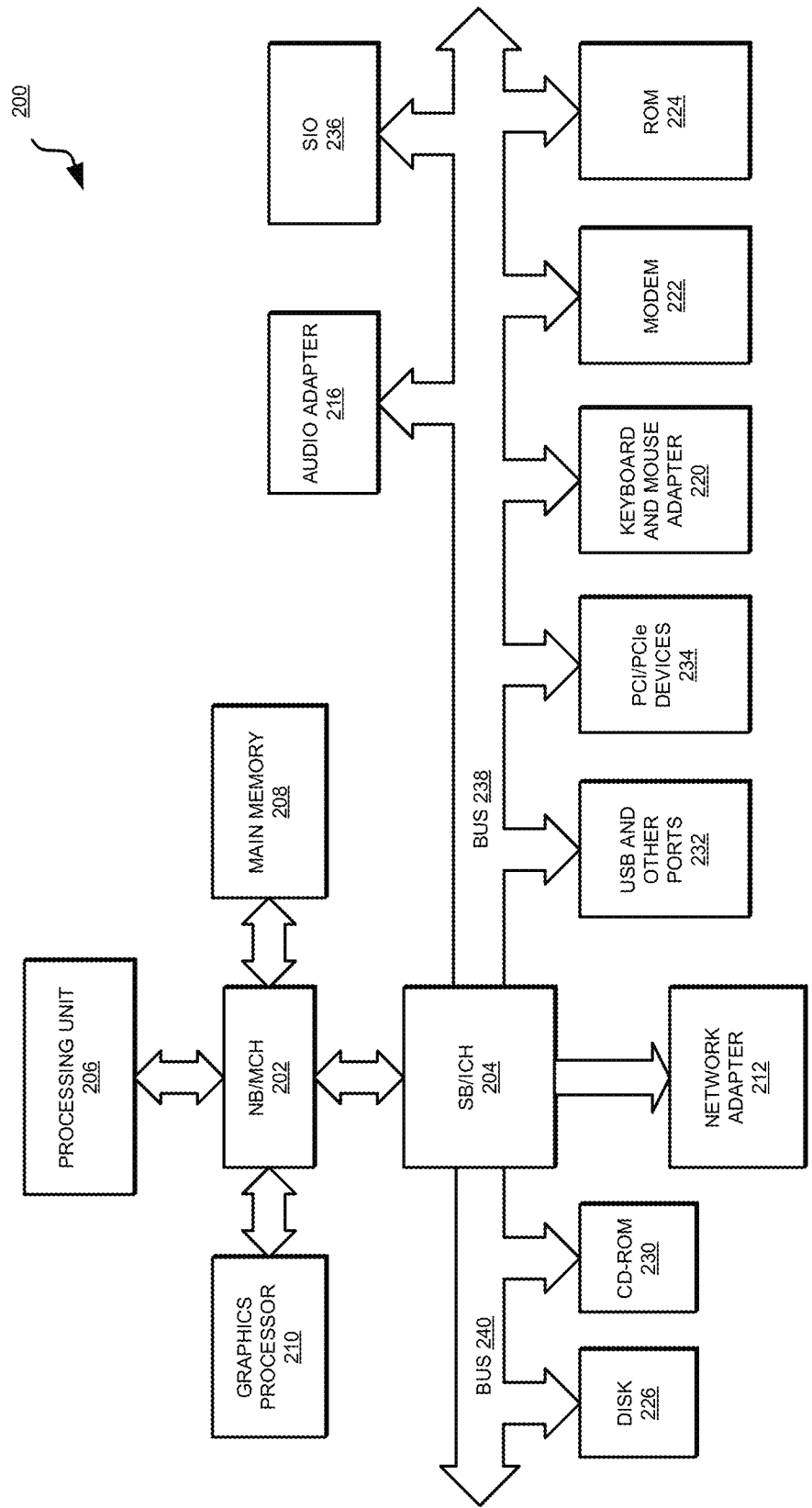
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. For example, the illustrative embodiments can also be implemented in a cloud based architecture using distributed computing and data communication systems.

Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

A server-side embodiment described herein can be implemented in the form of server application 105 in server 104. A client-side embodiment described herein can be implemented in the form of client application 134 in device 132. Client application 134 collects movement and pause data from accelerometer 136, and collects beacon communication data from communication module 138 in device 132. Client application 134 communicates with server application 105 over network 102. Server application 105 computes an optimal time to transmit content (not shown), the probability of a user interaction with the content, hangout patterns, and several other features as described herein using historical data 109. Example compositions of historical information 109 and the saving thereof in historical information repository 108 are described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as server application 105 and client application 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, a data processing system embedded in an accessory or another device such as in a wristwatch, or telephone device in addition to taking the form of a mobile or wearable device.

Figure 3:
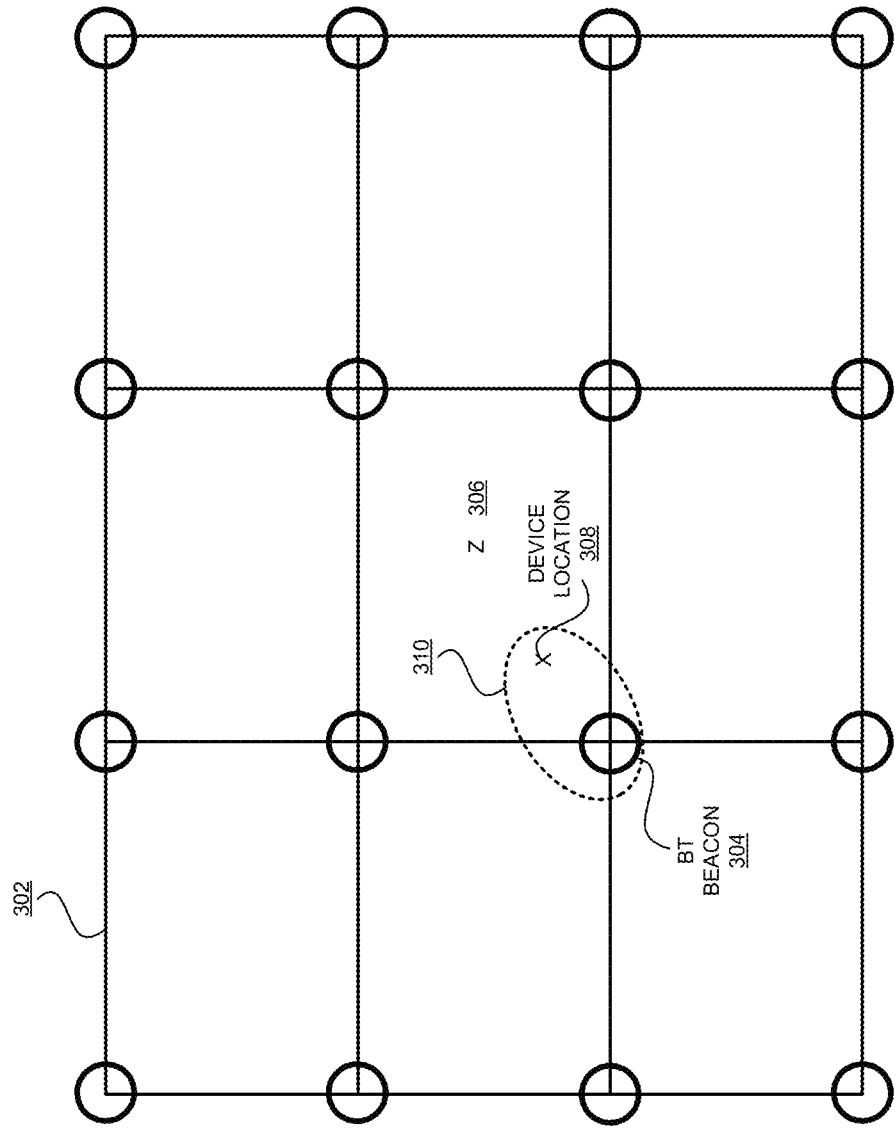
FIG. 3 depicts a block diagram of a locating a device in a space in accordance with an illustrative embodiment.

With reference to FIG. 3, this figure depicts a block diagram of locating a device in a space in accordance with an illustrative embodiment. Server application 105 in FIG. 1 maintains layout 302 of a space in which the movements of users are to be detected and content transmitted to users' devices.

Only as an example, assume that layout 302 is divided into a grid by placement of a set of communication beacons. Bluetooth beacon 304 is one example of such beacons. A zone is defined by a boundary where the boundary is formed by placing one or more beacons in a part of a space designed and mapped according to a planogram of an operator's space. For example, zone Z (306) is bound by several beacons, including beacon 304. A user's presence in zone 306 is detected by detecting a presence of the user's device at device location 308, within a range of a beacon, such as within range 310 of beacon 304.

As an example, beacon 304 may have a range of three feet, which would require device location 308 to be within three feet of beacon 304 to communicate with beacon 304. The geometry of layout 302, and beacon placements in that geometry to define the zones for detecting a user's presence depicted in this figure are only simplified examples for the clarity of the description. From this disclosure, those of ordinary skill in the art will be able to configure practically any layout geometry with any numbers of beacons to define any numbers or shapes of the zones within the geometry. Such configurations are contemplated within the scope of the illustrative embodiments.

Figure 4:
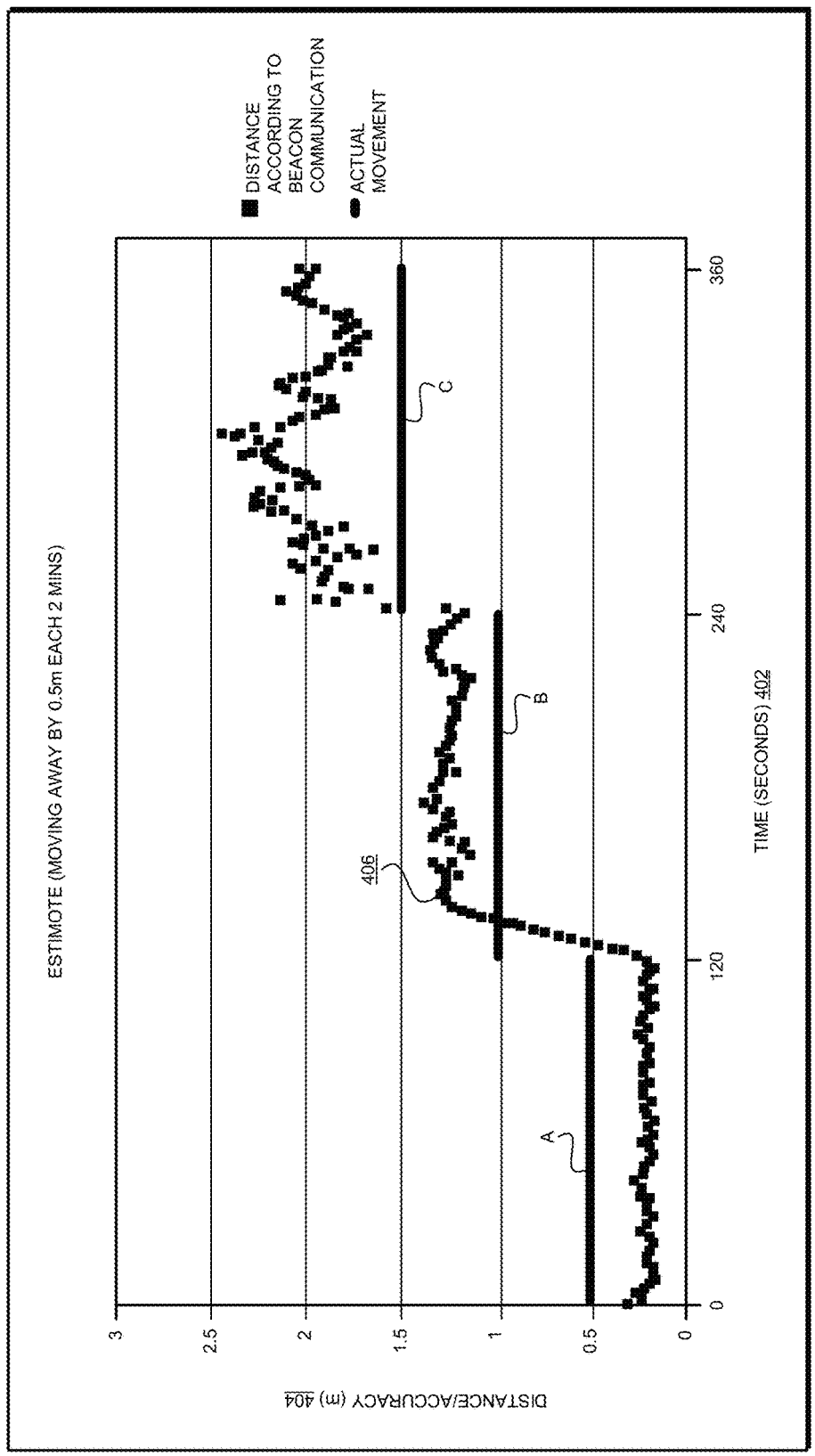
FIG. 4 depicts an example plot of user presence detection data in accordance with an illustrative embodiment.

With reference to FIG. 4, this figure depicts an example plot of user presence detection data in accordance with an illustrative embodiment. Communication module 138 of device 132 in FIG. 1 communicates with one or more beacons in a space layout, such as with beacon 304 in layout 302 in FIG. 3. The data of that communication is usable to compute a distance of device 132 from beacon 304 and other beacons. The computed distance is shown plotted along time axis 402 and distance axis 404 in the form of graph 406.

Particularly, graph 406 plots a computed movement of a user's device in the space by computing discrete distances of the device relative to beacons. Computed movement graph 406 shows that the user lingered or paused at a distance of 2 meters (from some beacon) for approximately two minutes. The actual pause of the user is plotted as graph section A. Graph 406 then shows that the user moved to a distance of approximately 1 meter and or paused there for approximately 2 minutes. The actual pause of the user is plotted as graph section B. Graph 406 then shows that the user moved to a distance of approximately 2 meter and or paused there for approximately 2 minutes. The actual pause of the user is plotted as graph section C.

As can be seen, the beacon communication based measurements according to an embodiment can detect the user's movements in a space within a degree of accuracy. However, that degree of accuracy is not dependable for detecting pauses in the user's movements, as is evident from comparing the portion of graph 406 that corresponds to graph section A with the portion of graph 406 that corresponds to graph section C. The measurements in section A appear to show a pause whereas the measurements in section C appear to show movement. This anomaly can be remedied by using accelerometer data as described herein, whereby the pause in a traversal trajectory of a user's device can be more accurately detected along with a probability of the user having the device in a viewing position.

Figure 5:
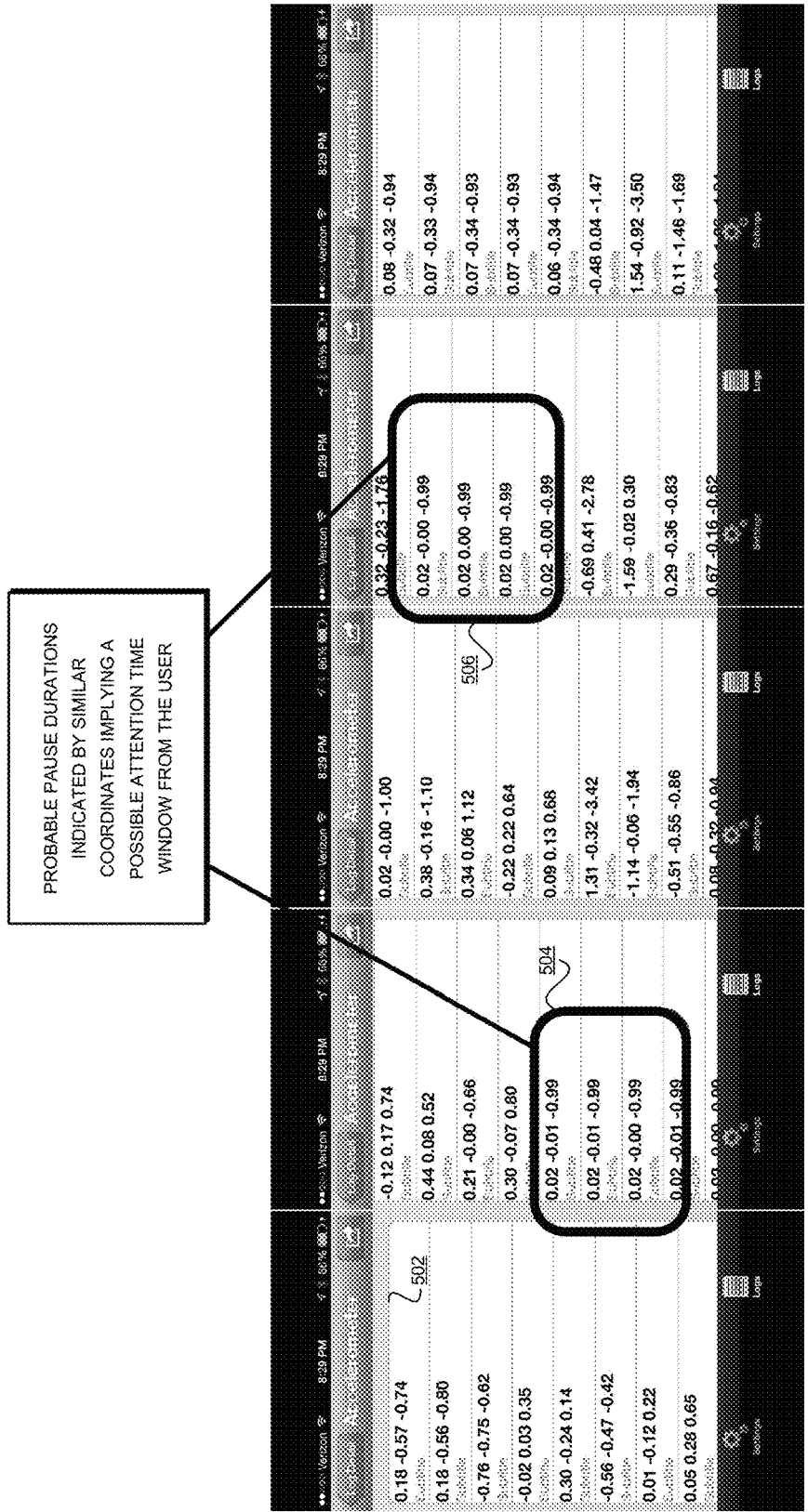
FIG. 5 depicts several screenshots of accelerometer data captured in accordance with an illustrative embodiment.

With reference to FIG. 5, this figure depicts several screenshots of accelerometer data captured in accordance with an illustrative embodiment. As an example, client application 134 collects accelerometer data periodically, such as accelerometer data 502, from accelerometer 136 in device 132 in FIG. 1.

Accelerometer data in blocks 504 and 506 shows that the accelerometer recorded no change in the data over certain periods. Thus, the accelerometer data in blocks 504 and 506 are indicative of probable pause durations during which the attention of the user can be attracted to the content.

Figure 6:
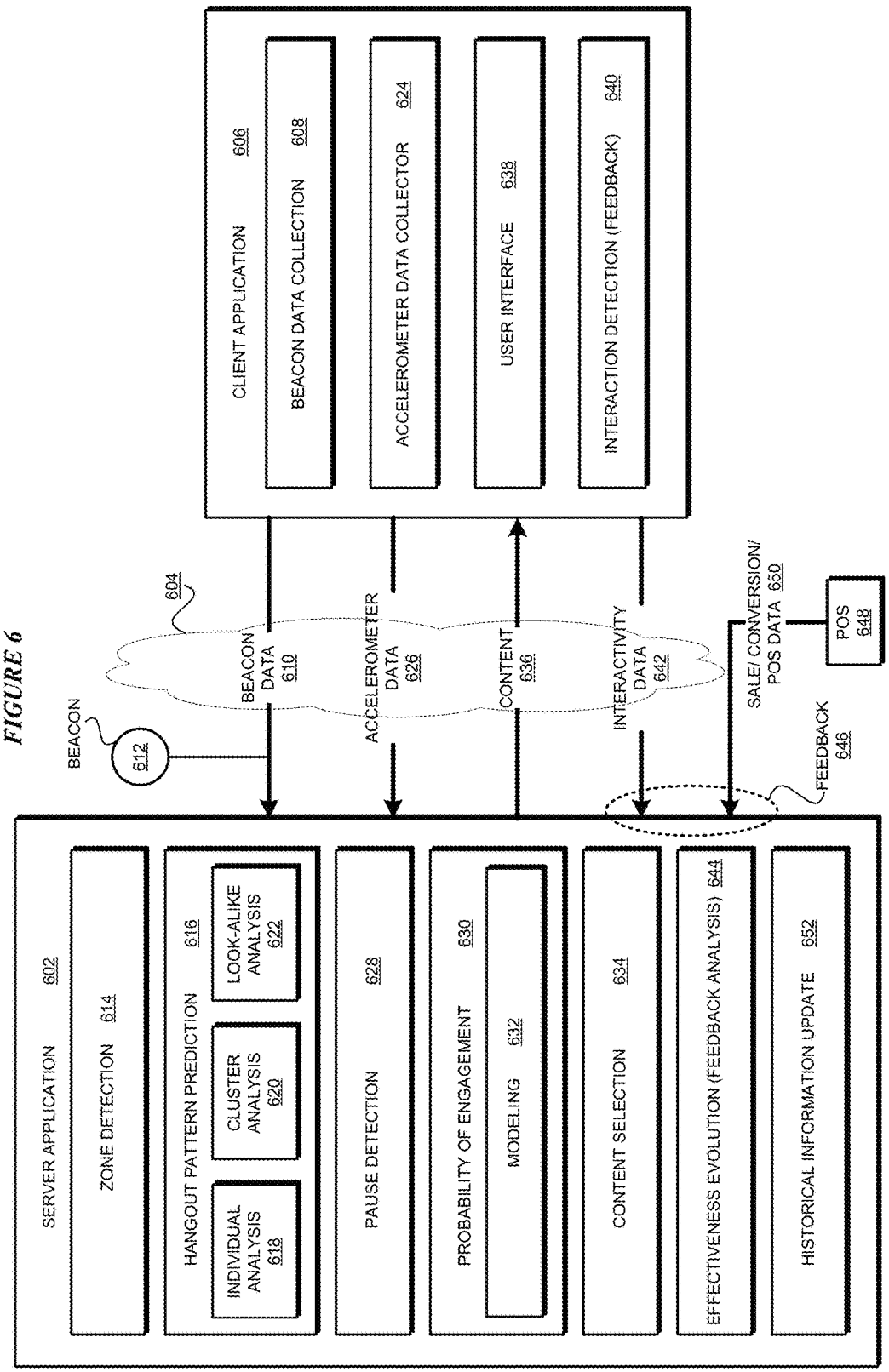
FIG. 6 depicts a block diagram of an example configuration for content targeting with probabilistic presentation time determination in accordance with an illustrative embodiment.

With reference to FIG. 6, this figure depicts a block diagram of an example configuration for content targeting with probabilistic presentation time determination in accordance with an illustrative embodiment. Server application 602 is an example of server application 105 in FIG. 1. Network 604 is an example of network 102 in FIG. 1. Client application 606 is an example of client application 134 in FIG. 1.

Component 608 in client application 606 collects beacon communication data when the device where client application 606 is executing communicates with a beacon in a space, such as with beacon 304 in layout 302 in FIG. 3. Client application 606 transmits beacon data 610 to server application 602. Alternatively, in some implementations, beacon 612, which is an example of beacon 304 in FIG. 3, provides beacon data 610 to server application 602.

Component 614 of server application 602 uses beacon data 610 to perform zone detection, to wit, detect the presence of the device of client application 606 in a zone, such as in zone Z (306) in FIG. 3. Along with beacon data 610, or in some other communication (not shown) between server application 602 and client application 606, client application 606 identifies the device to server application 602. Other inputs (not shown) to server application 602 provide the parameter values for a set of parameters—such as day, time, weather, occasion, and the like—that are associated with the current presence of the device in the zone.

Component 616 performs hangout pattern prediction using the device identification, the set of parameters, and any movement pattern the device may have performed upon entering the space. For example, component 616 performs individual analysis 618. Individual analysis 618 predicts a hangout pattern for the device by using matching historical information of the same device under similar parameters in historical information repository 108 of FIG. 1, as described elsewhere in this disclosure.

As another example, in some cases, component 616 performs cluster analysis 620. Cluster analysis 620 predicts a hangout pattern for the device by using matching historical information of a cluster of devices under similar parameters in historical information repository 108 of FIG. 1, as described elsewhere in this disclosure.

As another example, in some cases, component 616 performs look-alike analysis 622. Look-alike analysis 622 predicts a hangout pattern for the device by using matching historical information of another device under similar parameters in historical information repository 108 of FIG. 1, as described elsewhere in this disclosure.

Component 624 in client application 606 collects accelerometer data from an accelerometer in the device, such as accelerometer 136 in device 132 in FIG. 1. Client application 606 transmits accelerometer data 626 to server application 602. Component 628 uses accelerometer data 626 for pause detection in the device's movements through the space.

Component 630 computes a probability of engagement with the content when content is transmitted to the device. In one server-side embodiment, component 630 computes the probability of engagement using modeling methods such as Markov chain model in conjunction with beacon data 610 and accelerometer data 626 to detect or predict pauses in the device's traversal, to infer possible locations of interest to the user, and thereby compute the probability of engagement with relevant content.

As an example, in one embodiment, component 630 executes a pattern prediction Markov chain model against the geo data of a user to detect initial break or pause patterns in the foot traffic of the user. These pause patterns provide inference to possible areas of interest from the user based on the speed of movement through each defined geo zone. Using the pause patterns, the chain looks for probabilities of high, medium, or low scores that indicate if a customer is likely to view content on the user's device during the pauses. The example implementation uses as inputs—a hangout pattern detection score, a movement to pause detection of the accelerometer data, and past interactivity data from other users who have been presented content while in a zone and who interacted with the content. The embodiment creates a Markov matrix using these values to provide the probability score for each individual user.

Component 634 selects content 636 according to the user interest and probability of engagement predictions. Server application 602 transmits content 636 to client application 606. User interface (UI) 638 in client application 606 presents content 636 on the device to the user.

Component 640 in client application 606 detects user interaction or engagement with content 636 on UI 638. Client application 606 transmits interactivity data 642 collected by component 640 to server application 602.

Component 644 receives interactivity data 642 as feedback 646. In some cases, another system, such as POS system 648 may provide sales, conversion, or other POS data 650 as feedback 646. POS data 650 may supplement interactivity data 642, or may be in lieu of interactivity data 642, depending upon the particular circumstances. Conversion data is data that represents a sale opportunity that was "converted" into an actual sale.

Component 644 uses feedback 646 to perform effectiveness analysis of content 636. Component 652 updates the historical information repository with the information about the device, the movements, the pauses, interactivity with transmitted content, effectiveness of the content, set of parameters applicable to the presence of the device in the space, and similar information in a manner described herein.

Figure 7:
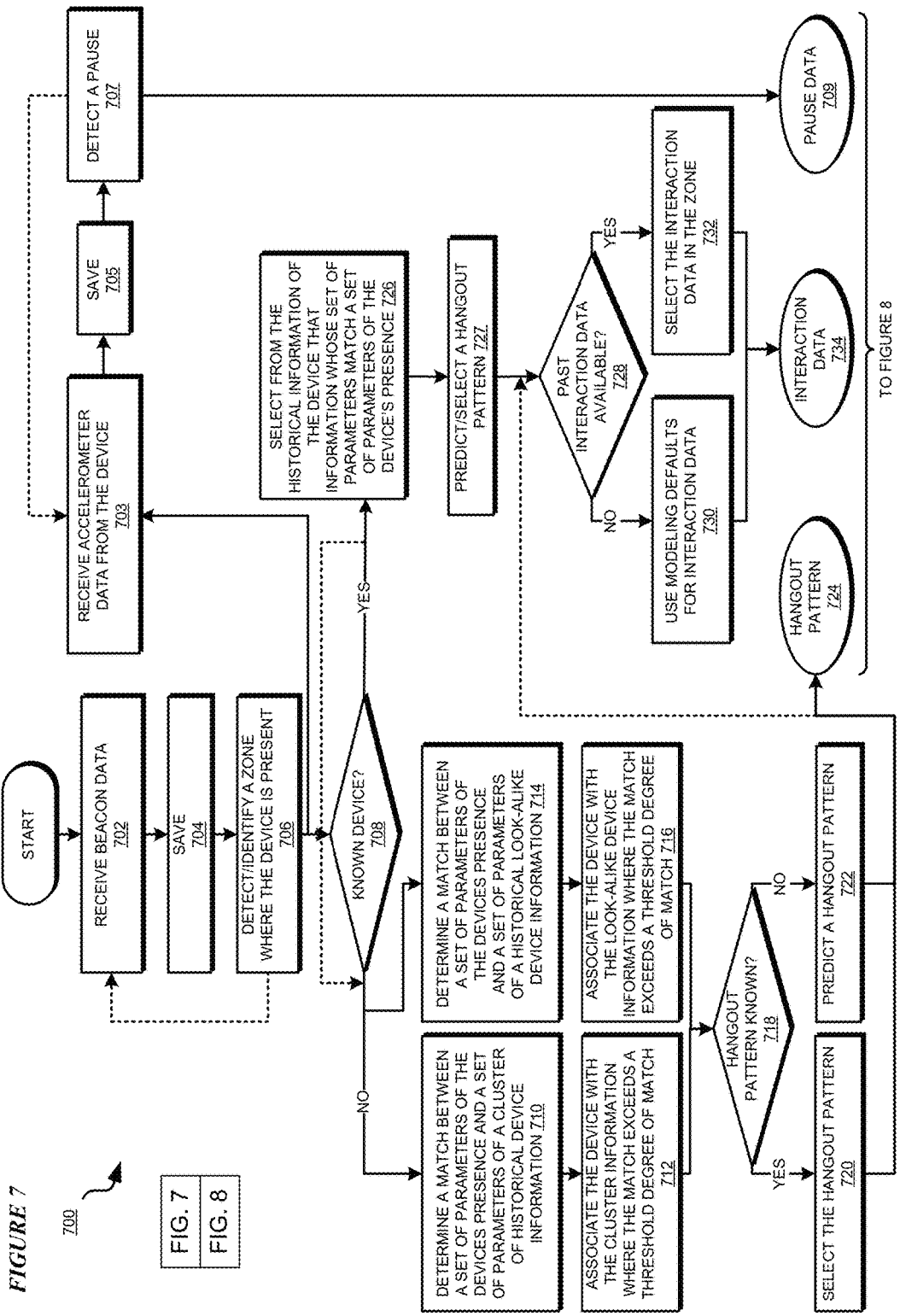
FIG. 7 depicts a flowchart of a portion of process for content targeting with probabilistic presentation time determination in accordance with an illustrative embodiment.

With reference to FIG. 7, this figure depicts a flowchart of a portion of process for content targeting with probabilistic presentation time determination in accordance with an illustrative embodiment. Process 700 can be implemented in server application 602 in FIG. 6.

The server application receives beacon data, e.g., from a client application or a beacon (block 702). The server application saves the beacon data (block 704). Using the beacon data, the server application identifies a zone in the space layout where the device is present (block 706).

The server application also receives accelerometer data from the device (block 703). The server application saves the accelerometer data (block 705). The server application detects a pause in the device's traversal using the accelerometer data (block 707). The server application produces pause data 709 from the processing at block 707.

The server application determines whether the device is a known device (block 708). If the device is not known ("No" path of block 708), the server application performs blocks 710 and 712, or blocks 714 and 716, or all four of blocks 710, 712, 714, and 716, depending upon the implementation.

For example, in one embodiment, the server application determines a match between a set or a subset of parameters of the device's presence and a corresponding set or a subset of the parameters of the historical data of a cluster of devices (block 710). The server application associates the device with the historical information of the cluster of devices (block 712).

As another example, in another embodiment, the server application determines a match between a set or a subset of parameters of the device's presence and a corresponding set or a subset of the parameters of the historical data of a look-alike device (block 714). The server application associates the device with the historical information of the look-alike device (block 716).

The server application determines whether a hangout pattern is already known for the cluster or the look-alike device (block 718). If the hangout pattern is known ("Yes" path of block 718), the server application selects the known hangout pattern as the expected hangout pattern for the device (block 720). If the hangout pattern is not known or not usable for any reason ("No" path of block 718), the server application predicts a hangout pattern that can be expected from the device (block 722) with consideration to the user's profile data, if available. As a result of the processing of block 720 or 722, the server application produces hangout pattern 724. In one embodiment, the server application may proceed to block 728 after blocks 720 or 722.

Even when a device is known at block 708, an embodiment may elect to perform some combination of blocks 710, 712, 714, and 716. Such modification of process 700 is contemplated within the scope of the illustrative embodiments.

Returning to block 708, in one embodiment, if the device is a known device ("Yes" path of block 708), the server application selects from the historical information of the device that historical information whose set or subset of parameters match the corresponding set or subset of parameters of the device's current presence in the space (block 726). The server application selects an existing hangout pattern corresponding to the selected historical information or predicts a hangout pattern based thereon (block 727).

The server application determines whether past interactivity data, or feedback data, is available from the selected historical information (block 728). If past interactivity or feedback data is unavailable or unusable for any reason ("No" path of block 728), the server application optionally uses default interactivity data set and user's profile data for modeling purposes (block 730). If past interactivity or feedback data is available and usable ("Yes" path of block 728), the server application selects the interactivity data related to the zone in which the device is present (block 732). As a result of the processing of block 730 or 732, the server application produces interactivity data 734.

Figure 8:
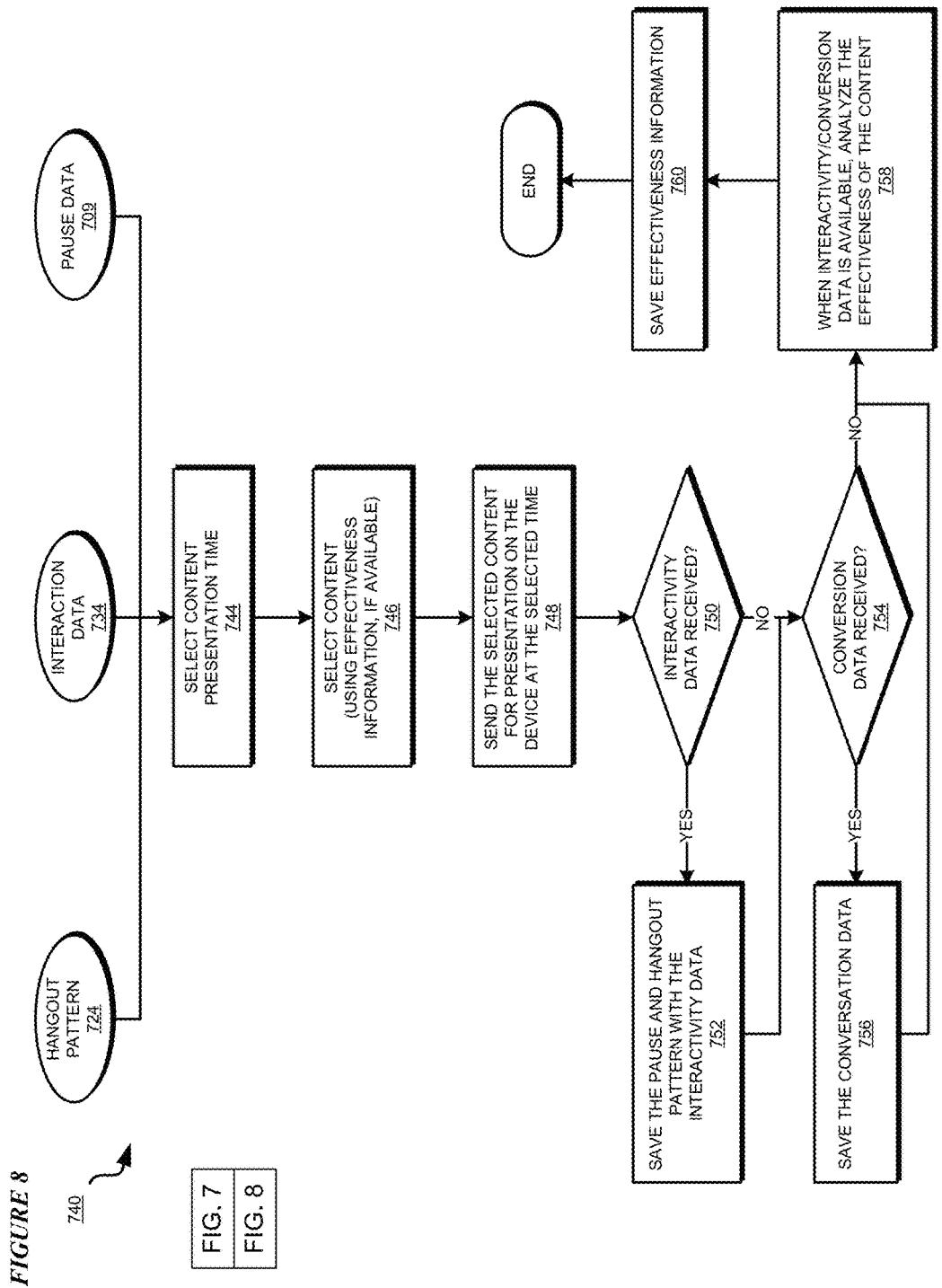
FIG. 8 depicts a flowchart of another portion of the process for content targeting with probabilistic presentation time determination in accordance with an illustrative embodiment.

The server application sends pause data 709, hangout pattern 724, and interactivity data 734 to process 740 in FIG. 8. The server application then enters process 740 in FIG. 8.

With reference to FIG. 8, this figure depicts a flowchart of another portion of the process for content targeting with probabilistic presentation time determination in accordance with an illustrative embodiment. Process 740 can be implemented in server application 602 in FIG. 6.

The server application uses hangout pattern 724, interactivity data 734, and pause data 709 to select a content presentation time (block 744). The content presentation time is a time at which the content is to be presented using a UI of the device. In one embodiment, the content presentation time is the time of transmitting the content, such that the duration of the transmission is negligible and the time of transmitting the content and the time of presenting the content can be deemed one and the same.

The server application selects the content using effectiveness information if available (block 746). In one embodiment, the effectiveness information is a probability that the content will receive user attention, i.e., the content will be effective, based on historical information.

The server application sends the selected content for presentation on the device at the time determined in block 744 (block 748). The server application determines whether interactivity data is received in response to presenting the content (block 750).

If interactivity data is received ("Yes" path of block 750), the server application saves the interactivity data together with the pause and hangout pattern information as new historical information pertaining to the device (block 752). If interactivity data is not received ("No" path of block 750), the server application determines whether conversion or POS data is received (block 754). If conversion data is received ("Yes" path of block 754), the server application saves the conversion data together with the pause and hangout pattern information as new historical information pertaining to the device (block 756).

If conversion data is not received ("No" path of block 754), or after the conversion data and/or the interactivity data has been saved, the server application proceeds to block 758. When the interactivity data or the conversion data or both are available, the server application analyzes the effectiveness of the content to determine whether the user interacted with the content, i.e., whether the content attracted the user's attention (block 758). The server application saves the effectiveness information (block 760). The server application ends process 740 thereafter.

Thus, a computer implemented method, system or apparatus, and computer program product are provided in the illustrative embodiments for content targeting with probabilistic presentation time determination. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for targeted presentation of information on a mobile device, the method comprising:

detecting, at an application executing using a processor and a memory, a presence of the device at a given time in a zone;

detecting a pause in a movement of the device in the zone;

associating, responsive to an item in the zone being situated proximate to a location of the pause, a location of the item with the location of the pause;

predicting a hangout pattern of the device, wherein the hangout pattern includes an expected pause duration of the pause;

computing, using the processor and the memory, for the item, whether the hangout pattern indicates a historical pause at the location of the detected pause resulting in a historical transaction relating to the item;

computing, responsive to the historical pause at the location of the detected pause resulting in the historical transaction relating to the item, using the processor and the memory, using the hangout pattern and the detected pause, a time within the detected pause to present a content on the device, wherein the content presented at the time is expected to have a higher than a threshold probability of receiving an input at the device;

computing a probability of receiving the input by using a historical information from a data source, wherein the historical information includes a past interactivity information about a past input received from other devices while in the zone responsive to a past content, and wherein the probability of receiving the input is based upon the past interactivity information, the hangout pattern, and the detected pause;

selecting the content according to the probability of receiving the input, the content relating to the item; and transmitting the content to the device such that the content is presented at the device at the computed time.

2. The method of claim 1, further comprising:

receiving from the device as feedback, responsive to receiving the input relative to the content, an interactivity data;

concluding from the interactivity data that the content was effective in receiving attention on the device; and saving the hangout pattern, the detected pause, and the interactivity data in a historical information corresponding to the device.

3. The method of claim 1, further comprising:

receiving from a system, responsive to a sale of an item related to the content, a feedback data;

concluding from the feedback data that the content was effective in receiving attention on the device; and saving the hangout pattern, the detected pause, and the feedback data in a historical information corresponding to the device.

4. The method of claim 1, wherein the historical information is used to predict the hangout pattern.

5. The method of claim 1, further comprising:

determining whether the probability of receiving the input exceeds the threshold probability, wherein a first content is selected as the content when the probability exceeds the threshold probability, and wherein a second content is selected as the content when the probability is up to the threshold probability.

6. The method of claim 1, further comprising:

determining that a historical information used in predicting the hangout pattern includes interactivity data; and using, in the computing the time to present the content, the interactivity data.

7. The method of claim 1, further comprising:

determining that a historical information used in predicting the hangout pattern excludes interactivity data; and using, in the computing the time to present the content, a default interactivity data set for a prediction model.

8. The method of claim 1, further comprising:

determining a set of parameters associated with the presence of the device in the zone;

determining whether a subset of the set of parameters match with a corresponding subset of a set of parameters in a historical information of the device, wherein to match, a parameter associated with the presence of the device has a value that is within a threshold tolerance of a value of parameter in the historical information; and using, responsive to the subset of parameters associated with the presence of the device matching the corresponding subset of parameters in a historical information of the device, a historical hangout pattern in the historical information as the hangout pattern of the device during a period, wherein the period includes the presence of the device in the zone.

9. The method of claim 1, further comprising:

determining a set of parameters associated with the presence of the device in the zone;

determining whether a subset of the set of parameters match with a corresponding subset of a set of parameters in a historical information of a second look-alike device, wherein to match, a parameter associated with the presence of the device has a value that is within a threshold tolerance of a value of parameter in the historical information; and using, responsive to the subset of parameters associated with the presence of the device matching the corresponding subset of parameters in a historical information of the second look-alike device, a historical hangout pattern in the historical information as the hangout pattern of the device during a period, wherein the period includes the presence of the device in the zone.

10. The method of claim 1, further comprising:

determining a set of parameters associated with the presence of the device in the zone;

determining whether a subset of the set of parameters match with a corresponding subset of a set of parameters in a historical information of a cluster of devices, wherein to match, a parameter associated with the presence of the device has a value that is within a threshold tolerance of a value of parameter in the historical information; and using, responsive to the subset of parameters associated with the presence of the device matching the corresponding subset of parameters in a historical information of the cluster of devices, a historical hangout pattern in the historical information as the hangout pattern of the device during a period, wherein the period includes the presence of the device in the zone.

11. The method of claim 1, wherein the hangout pattern further includes an expected traversal of the device from the zone and an expected second pause of the device in a second zone.

12. The method of claim 1, further comprising:

receiving accelerometer data from the device, wherein the accelerometer data includes a changing value during a first period when the device is moving during the first period, and wherein the accelerometer data includes an unchanging value corresponding to a second period when the device is not moving during the second period; and using the accelerometer data in detecting the pause in the movement of the device.

13. The method of claim 1, further comprising:

receiving beacon data from a transmitting beacon, wherein the device is within a range of the beacon by being present in the zone; and using the beacon data in detecting the presence of the device in the zone.

14. The method of claim 13, further comprising:

maintaining a layout of a physical space, the layout including a set of beacons situated at a corresponding set of known locations in the physical space, the set of beacons including the beacon, and the beacon identifying the zone in the layout.

15. The method of claim 1, wherein the application executes on a server, further comprising:

receiving beacon data from the device when the device moves within a range of the beacon; and using the beacon data in detecting the presence of the device in the zone.

16. A computer program product for targeted presentation of information on a mobile device, the computer program product comprising one or more computer-readable storage devices, and program instructions stored on at least one of the one or more storage devices, the stored program instructions comprising:

program instructions to detect, at an application executing using a processor and a memory, a presence of the device at a given time in a zone;

program instructions to detect a pause in a movement of the device in the zone;

program instructions to associate, responsive to an item in the zone being situated proximate to a location of the pause, a location of the item with the location of the pause;

program instructions to predict a hangout pattern of the device, wherein the hangout pattern includes an expected pause duration of the pause;

program instructions to compute, using the processor and the memory, for the item, whether the hangout pattern indicates a historical pause at the location of the detected pause resulting in a historical transaction relating to the item;

program instructions to compute, responsive to the historical pause at the location of the detected pause resulting in the historical transaction relating to the item, using the processor and the memory, using the hangout pattern and the detected pause, a time within the detected pause to present a content on the device, wherein the content presented at the time is expected to have a higher than a threshold probability of receiving an input at the device;

program instructions to compute a probability of receiving the input by using a historical information from a data source, wherein the historical information includes a past interactivity information about a past input received from other devices while in the zone responsive to a past content, and wherein the probability of receiving the input is based upon the past interactivity information, the hangout pattern, and the detected pause;

program instructions to select the content according to the probability of receiving the input, the content relating to the item; and program instructions to transmit the content to the device such that the content is presented at the device at the computed time.

17. The computer program product of claim 16, further comprising:

program instructions to receive from the device as feedback, responsive to receiving the input relative to the content, an interactivity data;

program instructions to conclude from the interactivity data that the content was effective in receiving attention on the device; and program instructions to save the hangout pattern, the detected pause, and the interactivity data in a historical information corresponding to the device.

18. A computer system for targeted presentation of information on a mobile device, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to detect, at an application executing using a processor and a memory, a presence of the device at a given time in a zone;

program instructions to detect a pause in a movement of the device in the zone;

program instructions to associate, responsive to an item in the zone being situated proximate to a location of the pause, a location of the item with the location of the pause;

program instructions to predict a hangout pattern of the device, wherein the hangout pattern includes an expected pause duration of the pause;

program instructions to compute, using the processor and the memory, for the item, whether the hangout pattern indicates a historical pause at the location of the detected pause resulting in a historical transaction relating to the item;

program instructions to compute, responsive to the historical pause at the location of the detected pause resulting in the historical transaction relating to the item, using the processor and the memory, using the hangout pattern and the detected pause, a time within the detected pause to present a content on the device, wherein the content presented at the time is expected to have a higher than a threshold probability of receiving an input at the device;

program instructions to compute a probability of receiving the input by using a historical information from a data source, wherein the historical information includes a past interactivity information about a past input received from other devices while in the zone responsive to a past content, and wherein the probability of receiving the input is based upon the past interactivity information, the hangout pattern, and the detected pause;

program instructions to select the content according to the probability of receiving the input, the content relating to the item; and program instructions to transmit the content to the device such that the content is presented at the device at the computed time.

* * * * *